US006636221B1

(12) United States Patent
Morein

(10) Patent No.: US 6,636,221 B1
(45) Date of Patent: Oct. 21, 2003

(54) GRAPHICS PROCESSING SYSTEM WITH ENHANCED BUS BANDWIDTH UTILIZATION AND METHOD THEREFORE

(75) Inventor: Stephen L. Morein, Cambridge, MA (US)

(73) Assignee: ATI International, Srl, Barbados (KN)

(*) Notice: Subject to any disclaimer, the term of this patent is extended or adjusted under 35 U.S.C. 154(b) by 362 days.

(21) Appl. No.: 09/630,783

(22) Filed: Aug. 2, 2000

(51) Int. Cl.[7] .................................................. G06F 15/80

(52) U.S. Cl. ........................ 345/505; 345/537; 345/538; 345/522

(58) Field of Search ................................ 345/505, 540, 345/582, 523, 519, 506, 536, 556, 545, 530, 560, 422, 522, 611, 614, 537, 538; 711/5, 104, 105, 156, 157, 170–173

(56) References Cited

U.S. PATENT DOCUMENTS 5,870,109 A * 2/1999 McCormack et al.
6,094,204 A * 7/2000 Takizawa
6,157,743 A * 12/2000 Goris et al.
6,349,372 B1 * 2/2002 Benveniste et al.

* cited by examiner

*Primary Examiner*—Matthew C. Bella
*Assistant Examiner*—Hau Nguyen
(74) *Attorney, Agent, or Firm*—Vedder, Price, Kaufman & Kammholz, P.C.

(57) ABSTRACT

A graphics processing system that includes a graphic processing circuit and an enhanced memory circuit is presented. The graphics processing circuit performs the rendering of graphics primitives to produce pixel fragment data. The pixel fragment data is then grouped into fragment blocks that are compressed and sent across a bus of limited bandwidth in an efficient manner to the enhanced memory circuit. Within the enhanced memory circuit, the compressed fragment blocks are decompressed and restored to their original state. Comparison and blending operations are then performed on a block-by-block basis with pixel data stored in the frame buffer.

20 Claims, 7 Drawing Sheets

GRAPHICS PROCESSING SYSTEM WITH ENHANCED BUS BANDWIDTH UTILIZATION AND METHOD THEREFORE

FIELD OF THE INVENTION

The invention relates generally to graphics processing and more particularly to a graphics processing system that uses a logic enhanced memory circuit and method therefore.

BACKGROUND OF THE INVENTION

Computer systems often include dedicated video graphics processing hardware in order to offload such processing from the central processor. The dedicated video graphics processing hardware typically uses a frame buffer to store the image data corresponding to graphics primitives that have been rendered. Data in the frame buffer is fetched and converted into a display signal that is provided to a display on which the image is presented to the viewer.

Rendering video graphic primitives to the frame buffer for three-dimensional (3D) applications typically involves fetching current pixel information from the frame buffer for a comparison operation with pixel fragments generated from the video graphics primitives received. The comparison determines if the positioning of the fragment with respect to the pixel data already in the frame buffer requires the color and Z (depth coordinate) data in the frame buffer to be updated. If the comparison indicates that the fragment can be discarded (e.g. the fragment lies behind the current pixel data and therefore is not visible), no information need be written back to the frame buffer. However, if the color data associated with the fragment is to replace that currently stored in the frame buffer, or for blending of the fragments color and the color from the frame buffer is required, the resulting color and Z data must be written back to the frame buffer.

In a typical video graphics processing system, the frame buffer, which often requires a significant amount of memory, is implemented as a stand-alone memory circuit separate from the graphics processing circuit. Thus, the frame buffer may be stored within a conventional dynamic random access memory (DRAM) integrated circuit, or other stand-alone memory circuit. Having to repeatedly retrieve data from this separate integrated circuit and often write data back to this separate integrated circuit based on pixel fragments generated can require a large amount of bandwidth over the bus coupling the memory that includes the frame buffer to the graphics processing circuit. As the pixel processing rates associated with graphics processing circuits increase, a communication bottleneck between the graphics chip that performs the rendering operations and the memory structure that stores the frame buffer can result. As such, overall system performance can be limited based on the bandwidth available over the bus connecting these two circuits.

Some prior art graphics processing systems have proposed moving portions of the render backend block that performs the comparison and blending operations into the memory circuit that stores the frame buffer. However, these prior art systems do not provide an efficient data transfer means between the graphics processing circuit and the memory circuit that includes the frame buffer such that the available bandwidth between these two circuits can be efficiently utilized. As such, bandwidth limitations still present a bottleneck such that the pixel processing rates demanded by the video graphics processing systems cannot be met.

DETAILED DESCRIPTION

Generally, the present invention provides a graphics processing system that includes a graphic processing circuit and an enhanced memory circuit. The graphics processing circuit performs the rendering of graphics primitives to produce pixel fragment data. The pixel fragment data is then grouped into fragment blocks that are compressed and sent across a bus of limited bandwidth in an efficient manner to the enhanced memory circuit. Within the enhanced memory circuit, the compressed fragment blocks are decompressed and restored to their original state. Comparison and blending operations are then performed on a block-by-block basis with pixel data stored in the frame buffer.

By ensuring that only valid data is sent across the bus from the graphics processing circuit to the enhanced memory circuit, the available bandwidth between these two circuits is utilized efficiently. This differs from prior art solutions that sent blocks of fragment data across the bus that included both valid and invalid fragments, thus wasting what limited bandwidth was available. By using the grouping and compression techniques described herein, the limited bandwidth on the bus can be utilized efficiently such that higher pixel processing rates can be achieved with respect to those that could be obtained using prior art techniques.

Figure 1:
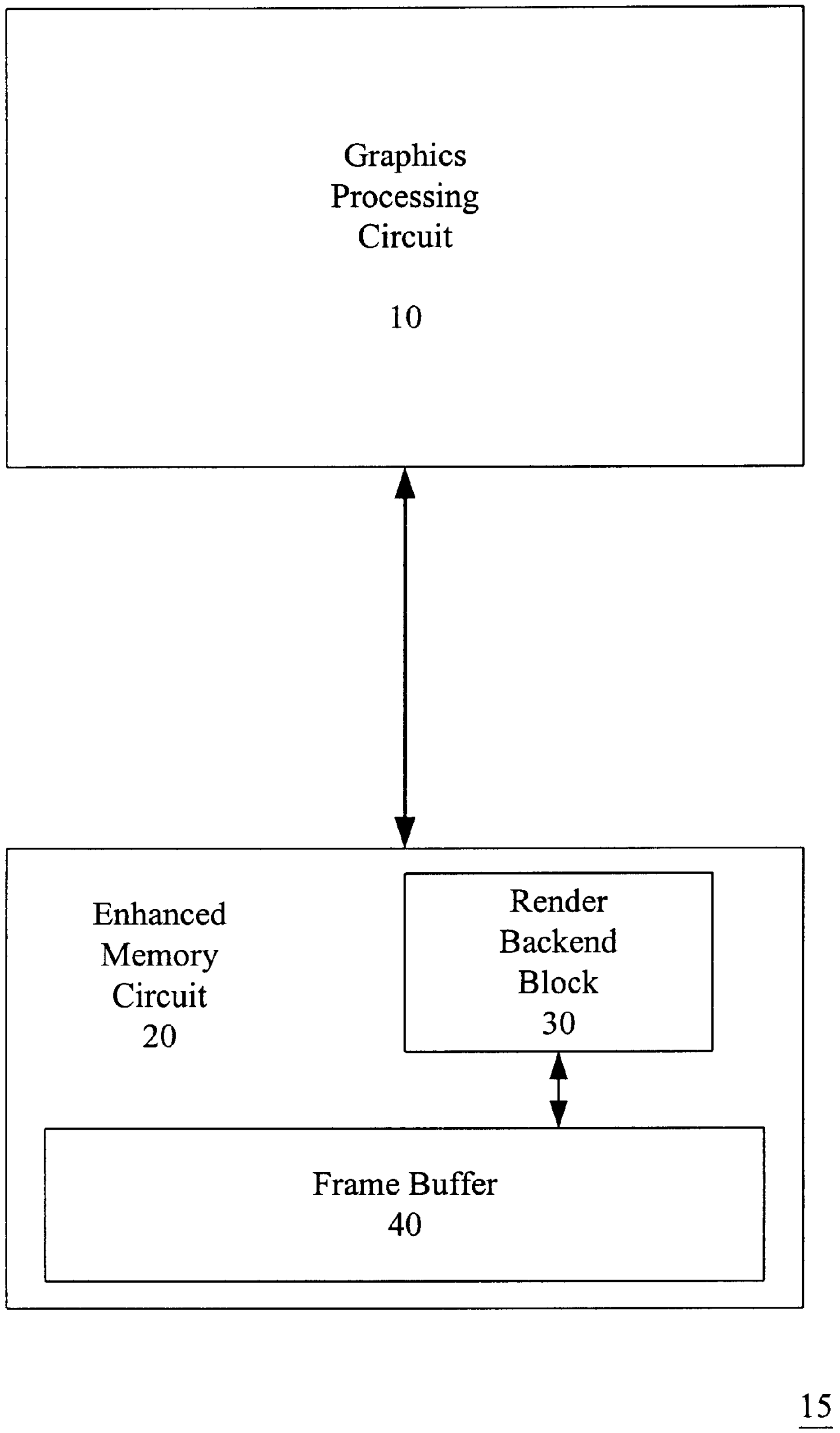
FIG. 1 illustrates a block diagram of a graphics processing system in accordance with a particular embodiment of the present invention.

The invention can be better understood with reference to FIGS. 1–8. FIG. 1 illustrates a block diagram of a graphics processing system 15. The graphics processing system 15 includes a graphics processing circuit 10 and an enhanced memory circuit 20, which may also be referred to as a logic enhanced memory. The graphics processing circuit 10 preferably includes a three-dimensional (3D) graphics processing pipeline that receives 3D graphics primitives and generates pixel fragments based on these primitives. Such a 3D pipeline may perform functions such as lighting operations, texture-mapping operations, fogging operations, or other effect adding operations that are commonly used within such graphics processing circuits. The graphics processing circuit 10 may also include a two-dimensional (2D) graphics processing block that generates additional graphics data for display. Display signal generation circuitry may also be included in the graphics processing circuit 10, where the display generation circuitry fetches image data stored in a frame buffer and produces a display signal that is then provided to a display such as a flat panel or a cathode rate tube (CRT) display.

The enhanced memory circuit 20 includes a memory array that stores a frame buffer 40 associated with storing the image data produced by the graphics processing circuit 10. Also included in the enhanced memory circuit 20 is at least a portion of a render backend block 30. The render backend block 30 performs operations that include retrieving current pixel data stored in the frame buffer 40 for comparison with pixel fragments received, and when the pixel fragments are determined to modify the image data stored in the frame buffer, the resulting modifications are written back into the frame buffer 40. By including the comparison and modification portions of the render backend block 30 in the enhanced memory circuit 20, the reading and writing operations between the render backend block 30 and the frame buffer 40 are performed within the enhanced memory circuit 20. As such, the pixel fragments can simply be written from the graphics processing circuit 10 to the enhanced memory circuit 20 for further processing. This differs from typical prior art solutions that included the render backend block within the graphics processing circuit while the frame buffer was stored in a separate memory circuit. Such prior art system suffer from a bottleneck in terms of the data transfer bandwidth available between the graphics processing circuit and the memory that included the frame buffer. In such prior art systems, pixel data had to be retrieved from the frame buffer memory using the bus and compared with the pixel fragments, and when the pixel fragment data required modification of the frame buffer, the resulting data would once again have to traverse the bus such that it could be written into the frame buffer.

Figure 2:
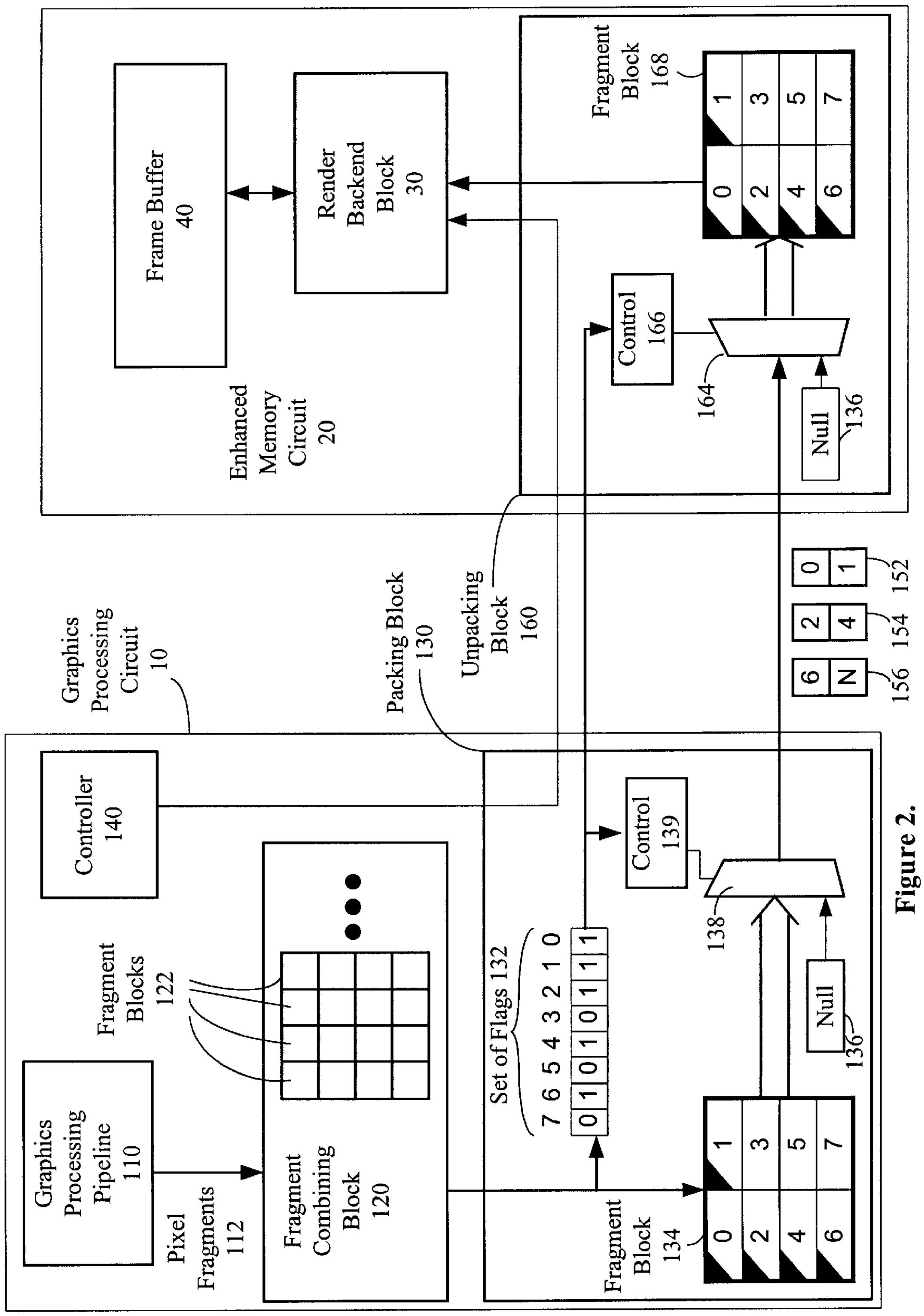
FIG. 2 illustrates a more detailed block diagram of a particular embodiment of the graphics processing system of FIG. 1 in which particular detail is provided for the data transmission circuitry that conveys data from the graphics processing circuit to the enhanced memory circuit in accordance with a particular embodiment of the present invention.

FIG. 2 illustrates a more detailed view of a particular embodiment of the graphics processing system 15 as illustrated in FIG. 1. As shown in FIG. 2, the graphics processing circuit 10 includes a graphics processing pipeline 110, a fragment combining block 120, a packing block 130, and a controller 140. The enhanced memory circuit 20 includes a frame buffer 40, a render backend block 30, and an unpacking block 160.

The graphics processing pipeline 110 preferably includes a 3D graphics processing pipeline that receives graphics primitives and produces pixel fragments 112. The graphics primitives may be received from a central processor included in the computer system that includes the graphics processing circuitry illustrated in FIG. 2. The graphics processing system of FIG. 2 may be included on an expansion card included in such a computer system, or may be included on the motherboard of the computer system.

The pixel fragments 112 generated by the graphics processing pipeline 110 are grouped into fragment blocks 122 by the fragment combining block 120. Each of the fragment blocks 122, which may also be referred to as data packets, includes a predetermined number of locations for a predetermined number of pixel fragments. Preferably, the predetermined number of locations for pixel fragments included in each fragment block is an integer greater than 7. In one embodiment, the predetermined number of pixel fragments is 8, whereas in other embodiments, each fragment block may include a greater number of fragments such as 16 or 32.

Within which fragment block a particular pixel fragment is stored is preferably determined based on the pixel coordinates for the pixel fragment. Thus, the display space is grouped into blocks of pixels such that those fragments corresponding to neighboring pixels are likely to be included in the same fragment block. In one embodiment, a fragment block may store fragments corresponding to a rectangular group of pixels that is two pixels wide and four pixels high. As is apparent to one of ordinary skill in the art, a number of different groupings of pixel locations may be used to create the fragment blocks.

As the fragment combining block 120 receives the pixel fragments 112 and groups them into the various fragment blocks 122, certain fragment blocks are selected for transmission to the enhanced memory circuit 20 for subsequent processing. A location in a fragment block that stores a valid pixel fragment may be referred to as a filled location. The fragment combining block 120 may select which fragment blocks are to be forwarded to the enhanced memory circuit 20 based on the number of filled locations in a particular fragment block. Thus, in an example where each fragment block includes eight locations, any fragment block that currently stores six or more valid fragments (is 75% full) may be selected for forwarding to the enhanced memory circuit 20. In other embodiments, the determination as to which of the fragment blocks are to be forwarded may be based on the length of time a particular fragment block has stored one or more valid pixel fragments. Thus, if a pixel fragment has been included in a particular fragment block for a predetermined threshold time period, the fragment block may be forwarded regardless as to the total number of valid pixel fragments that it currently stores. This ensures that pixel fragments do not languish in the fragment combining block 120 for extended periods of time.

In one embodiment, a combination of the two selection criteria may be utilized. Thus, if no fragment blocks are approaching the threshold at time for storage of valid pixel fragments, the fullest fragment block may be selected for forwarding. However, if certain fragment blocks have stored pixel fragments for an extended period of time, they may be given preferential treatment such that a timely processing of the pixel fragments is ensured.

Another reason for forwarding a fragment block is fragment overlap. If a first fragment is stored in a location and a second fragment is generated corresponding to the same location before the fragment block has been forwarded, the data in the fragment block may be forwarded immediately such that the second fragment can be stored at the location without overwriting the first fragment. In some embodiments, some fragment comparison circuitry may be included in the fragment combining block 120 such that the conflict between the first and second fragments can be resolved and only one relevant fragment is stored in the fragment block pending further processing.

Prior to forwarding a fragment block 134 to the packing block 130, the fragment combining block 120 determines a set of flags 132 for the fragment block, where the set of flags 132 indicates which locations in the fragment block 134 are filled locations that store valid pixel fragments. For example, if a fragment block includes eight locations, the set of flags will include eight flags, where each flag corresponds to a particular location. In one case, a set bit, or "1" value in a flag of the set of flags indicates that there is a valid pixel fragment within the fragment block at a corresponding location. As is apparent to one of ordinary skill in the art, different logic states could be used indicate valid pixel fragments such that in another embodiment a "0", or cleared bit, may represent the inclusion of valid pixel data within a fragment block.

Packing block 130 receives the fragment block 134 and the corresponding set of flags 132 from the fragment combining block 120. In the example shown in FIG. 2, the fragment block 134 includes eight locations numbered 0–7. Those locations that store a valid pixel fragment are shown to include a shaded triangle in the upper left hand corner. Thus, in the example presented, valid pixel fragments are included at locations 0, 1, 2, 4, and 6. These valid pixel fragments are also identified based on the bits that are stored in the set of flags 132.

The packing block 130 generates a stream of data based on pixel fragments stored in filled locations within the fragments blocks that it receives from the fragment combining block 120. The stream of data is constructed based on the set of flags that accompanies each fragment block received. The generation of the stream of data may be accomplished using a control block 139 and a serializing block 138. The control block 139 determines which of the locations within the fragment block 134 are included in the stream of data by controlling the serializing block 138. For the particular example shown in FIG. 2, the portion of the stream of data resulting from the serialization of the fragment block 134 may include the three flits 154–156. In the example embodiment illustrated, each flit includes up to two pixel fragments. Thus, the serializing block 138 receives an indication from the control block 139 that the first flit 152 should be constructed of the pixel fragments stored at locations 0 and 1. Similarly, the second flit 154 is constructed to include the pixel fragments stored at locations 2 and 4 of the fragment block 134. The third flit 156 is constructed to include the valid pixel fragment at location 6 of the fragment block 134. However, because each flit is expected to include two fragments worth of data, a null value, which may be included using a null register 136 is inserted as the second fragment included in the flit 156.

Each fragment included in a flit transferred to the enhanced memory circuit 20 may include both color data and Z data corresponding to a particular pixel location. Thus, in one embodiment, each fragment includes 32 bits of color data and 32 bits of Z data. In such an example, the data bus that carries the flit from the graphics processing circuit 10 to the enhanced memory circuit 20 may be 128 bits wide. This allows an entire flit to be carried across the bus in a parallel manner. In other embodiments, a smaller bus width may be utilized, where an additional level of serialization is performed by the serializing block 138. Thus, the packing block 130 generates a stream of data such that the width of the stream of data complies with the width limitations of the bus. For example, for a 64-bit bus, single pixel fragments may be sent across the bus individually rather than in two fragment flits. In a particular embodiment, a 32-bit bus is used to transfer the flits from the graphics processing circuit 10 to the enhanced memory circuit 20. Larger bus widths require more pins on the graphics processing circuit 10 and the enhanced memory circuit 20 when these circuits are implemented as integrated circuits.

In prior art systems, the entire fragment block 134 may have been transmitted across to the enhanced memory circuit 20 without regard for which of the locations in the fragment block 134 actually stored valid pixel fragments. As such, bandwidth required to send every fragment block would be that required to send 8 pixel fragments. By using the teachings presented herein, a fragment block that includes fewer than 8 valid pixel fragments can be sent over the bus utilizing less bandwidth as only the relevant valid pixel fragments are sent across the bus (with the inclusion of an occasional null value as a place holder).

The unpacking block 160 of the enhanced memory circuit 20 receives the stream of data that includes the flits 152–156. The unpacking block 160 also receives the set of flags 132 that indicates to which locations in the fragment block the pixel fragments included in the flits correspond. Based on this information, the unpacking block 160 reconstructs the fragment block used to construct the stream of data. This is performed utilizing the set of flags, and may be accomplished by the control block 166 and a de-serializing block 164.

The control block 166 receives the set of flags 132 and issues the appropriate control signals to the de-serializing block 164 such that the flits are separated into individual pixel fragments and these pixel fragments are stored at their appropriate locations in the reconstructed fragment block 168. Because some of the locations within the reconstructed fragment block 168 do not contain valid pixel data, a null register 162 may be used to provide the null values to be stored as these invalid locations.

The set of flags may be carried from the graphics processing circuit 10 to the enhanced memory circuit 20 over the same bus used to transfer the flits 152–156, or the set of flags may be transferred over a separate set of additional signal lines. In one embodiment, the set of flags may be transferred over a set of signals used to relay commands from the graphics processing circuit 10 to the enhanced memory circuit 20. This will be described in additional detail with respect to FIG. 7 below.

Once the unpacking block 160 has reconstructed the fragment block 168, the reconstructed fragment block 168 is forwarded to the render backend block 30. The render backend block 30 blends pixel fragments contained within the fragment blocks that it receives with image data stored in the frame buffer 40. The blending performed by the render backend block 30 is on a block-by-block basis such that pixel fragments included in each fragment block are blended in parallel.

In an example blending operation for an 8-fragment fragment block, the render backend block 30 retrieves data corresponding to 8 pixel locations from the frame buffer 40, where the 8 pixel locations correspond to those locations for which fragment data is stored in the fragment block to be blended. For the valid pixel fragments stored within the fragment block 168, the render backend block will perform the Z comparison operations required to blend a fragment with stored pixel data. If the Z comparison indicates that the fragment is in front of the currently stored pixel data, and therefore is visible, the color value corresponding to the fragment is written into the frame buffer 40 along with the new Z value. Note that in some embodiments, alpha blending may be supported. Blending operations involving alpha blending are commonly known in the art.

When the render backend block 30 has finished performing the Z comparison operations for a particular fragment block, the resulting blended fragment block produced is written to the frame buffer 40 in a single block write operation. Preferably, the frame buffer 40 is stored within a memory array such as a DRAM memory structure that allows for a large amount of data to be read and written in parallel. Examples of DRAM structures will be described in additional detail with respect to FIG. 7 below. The size of the blocks processed during each operation of the render backend block 30 may be determined based on the minimum fetching limitations of the DRAM memory that includes the frame buffer 40. By allowing multiple pixel fragments to be blended in parallel, the circuitry that performs such blending operations can be consolidated and a higher pixel processing rate can be achieved. The inclusion of such blending circuitry on an integrated circuit that includes a large DRAM array can be significantly more expensive than the inclusion of similar circuitry in a non-DRAM integrated circuit, and as such, simplification of this circuitry is desirable. This is because the processing steps associated with manufacturing DRAM memory circuits are often specialized and generally not suited to the production of large amounts of complex logic.

The render backend block 30 may be capable of performing a number of operations in addition to blending of fragment blocks. The particular instruction executed by the render backend block 30 may be controlled based on one or more commands received from the controller 140 that is included in the graphics processing circuit 10. The provision of various instructions to the render backend block 30, or a similar block that can perform a large variety of operations, is described in additional detail with respect to FIGS. 3 and 7 below.

The technique for transmitting fragment blocks across a bus in the efficient manner described with respect to FIG. 2 can be extended for use in a variety of applications. In the general sense, the teaching provides a method for transmitting data packets across a bus that connects a first integrated circuit and a second integrated circuit. Such a method begins by receiving a data block within the first integrate circuit that includes a plurality of entries, where at least a portion of the entries are valid entries. This is analogous to receiving a fragment block where a portion of the locations in the fragment block store valid pixel fragments.

Based on the data block, or packet, received, a set of flags is generated, where the set of flags indicates which entries of the data block are valid entries. The data block is then compiled into a set of transmission blocks, where each transmission block includes at least one valid entry. This is analogous to the creation of flits from the fragment block. In some embodiments, each transmission block may include a single valid entry whereas in other embodiments, each transmission block may include two or more valid entries. In some instances, null values may have to be inserted in some of the transmission blocks to serve as placeholders. In the case where null values may have to be inserted and each transmission block includes two locations, the set of transmission blocks for a particular data block would include no more than one such invalid entry that serves as a placeholder.

The transmission blocks assembled from the data block are sent across the bus to the second integrated circuit. The set of flags is also sent to the second integrated circuit. Based on the set of flags and the transmission blocks for the data block, the second integrated circuit can perform the steps necessary to reassemble the data block in its original form. Thus, although the embodiment described with respect to FIG. 2 primarily concerns the use of such a method in a video graphics application, the bus bandwidth efficiencies gained through such a technique can be applied to a number of other applications.

Figure 3:
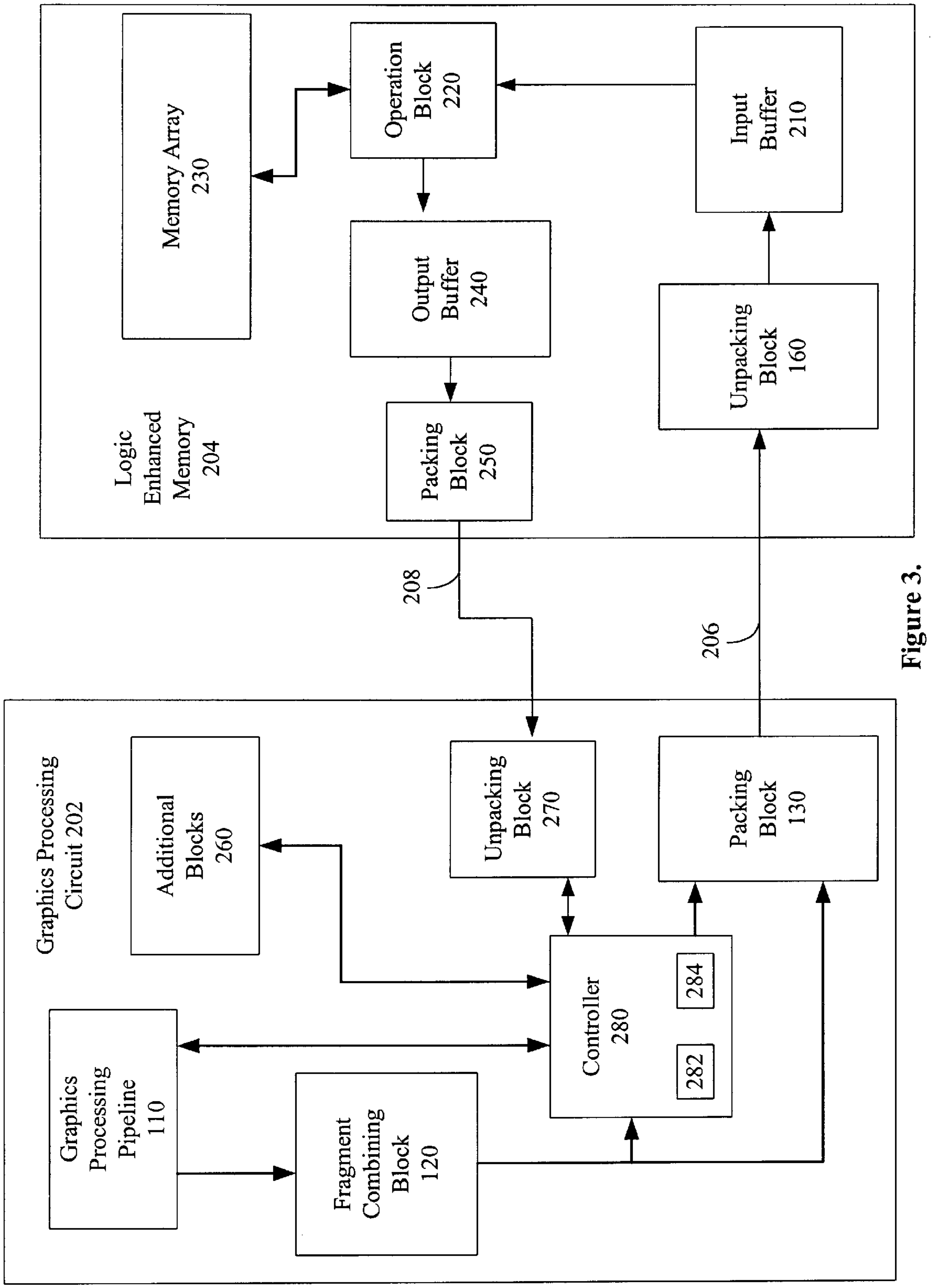
FIG. 3 illustrates a block diagram of another embodiment of the graphics processing system of FIG. 1 including buffers and associated control circuitry utilized in the exchange of data between the graphics processing circuit and the logic enhanced memory in accordance with a particular embodiment of the present invention.

In order to further improve the efficiency with which the available bandwidth between the graphics processing circuit and the enhanced memory circuit is used, an input buffer may be included in the enhanced memory circuit to allow data transferred from the graphics processing circuit to be buffered prior to use with the new enhanced memory circuit. Similarly, an output buffer may be included in the enhanced memory circuit to allow data to be returned to the graphics processing circuit, such as that required for generating a display signal, to be buffered prior to forwarding across a similar bus of limited bandwidth. FIG. 3 provides a block diagram of a graphics processing system that includes a graphics processing circuit 202 and a logic enhanced memory 204. The logic enhanced memory 204 includes an operation block 220 that may perform functions such as those performed by a render backend block, as well as other functions.

The description provided for FIG. 2 above describes how fragments blocks can be compressed into flits that are transferred across a bus 206 from a packing block 130 of the graphics processing circuit 202 to an unpacking block 160 of the logic enhanced memory 204. Because different fragment blocks may include different numbers of flits, and each fragment block corresponds to a separate operation to be performed by the operation block, the rate with which operation data is transferred from the graphics processing circuit 202 to the logic enhanced memory 204 can fluctuate based on the amount of data included in each fragment block. For example, if a number of fragment blocks that only include two flits of fragment data are sequentially sent across the bus 206 for processing, the effective rate with which commands are being transferred across that bus is greater than if a number of fragment blocks that required four flits to transfer the data for each command were utilized.

Because the operation block 220 operates at a generally fixed rate, fluctuations in the rate that commands are received can lead to attempted over- or under-utilization of the operation block 220. As such, an input buffer 210 is included in the logic enhanced memory 204 that allows for buffering of received commands and associated data such that the operation block 220 is not over- or under-utilized.

Similarly, the operation block 220 may produce resultant data that needs to be relayed from the logic enhanced memory 204 to the graphics processing circuit 202. However, the frequency with which such resultant data is produced may be variable such that dedicating a large amount of interconnect for a bus to carry data from the logic enhanced memory 204 to the graphics processing circuit 202 may be somewhat wasteful in terms of required pin count. As such, the output buffer 240 included in the logic enhanced memory 204 allows resultant data that is to be transferred back to the graphics processing circuit 202 to be buffered in a manner that allows a bus of limited bandwidth 208 to be utilized in an efficient manner.

The graphics processing circuit 202 of FIG. 3 includes a graphics processing pipeline 110, a fragment combining block 120, and a packing block 130. These blocks were generally described with respect to FIG. 2 above. However, in the embodiment illustrated in FIG. 3, the packing block 130 also receives command data from a controller 280. The commands generated by the controller 280 are sent over the bus 206, which can include data lines and control lines, where the data lines transport the fragment block flits and the control lines transport the commands to be executed by the operation block 220. The controller 280 includes circuitry that is use to ensure that the input butter 210 and the output buffer 240 are not utilized beyond their capabilities, while also ensuring that the operation block 220 is used as efficiently as possible. The specific operation of the controller 280 is described in additional detail below.

The graphics processing circuit 202 also includes additional blocks 260, which may include a 2D processing circuit, a display generation circuit, or other circuits that may require access to data stored in the frame buffer on the logic enhanced memory 204. The additional blocks 260 are coupled to the controller 280 and communicate with the logic enhanced memory 204 via the controller 280. Also included on the graphics processing circuit 202 is an unpacking block 270 associated with unpacking compressed data received from the logic enhanced memory 204. The operations of the unpacking block 270 will be described in additional detail below.

The logic enhanced memory 204 includes an unpacking block 160 which is similar to that described with respect to FIG. 2 above. The unpacking block 160 provides fragments blocks to the input buffer 210 along with their corresponding commands at a variable rate, where the rate at which the unpacking block 160 provides the fragment blocks is based on the number of flits included in each fragment block. Thus, when fragment blocks that include fewer flits are received by the unpacking block, it is able to unpack these fragment blocks more rapidly (because they are received more rapidly) and provide them to the input buffer 210 at a higher rate. Conversely, fragment blocks that require a larger number of flits to be transported across the bus 206 require additional time for the transmission of the additional flits and as such, reassembly in the unpacking block 160 requires additional time. As such, these fragment blocks will be provided to the input buffer 210 at a slower rate.

The logic enhanced memory 204 includes an operation block 220 that performs various operations utilizing data stored in the frame buffer, which is preferably stored in the memory array 230. The operations also utilize fragment blocks, or other blocks of input data received from the input buffer 210. The logic enhanced memory 204 also includes the output buffer 240 and packing block 250 that facilitate the transmission of result data generated by the operation block 220 to the graphics processing circuit 202.

As stated above, the input buffer 210 receives commands associated with data unpacked by the unpacking block 160, where the commands and their associated data are received at a variable rate. The variable rate is determined based on the amount of data for each command received. The operation block 220 receives the commands and corresponding data from the input buffer 210 and executes these commands at a fixed rate to produce resultant data.

In one example embodiment, the operation block 220 may operate execute commands at a clock rate of 166 Megahertz. If the data for a particular command can come across the bus 206 in one of two, three, or four flits, the input buffer 210 will receive data for each command at a variable rate. Assuming that the bus 206 is able to transfer 128 bits of data at a rate of approximately 512 Megahertz, which may be the equivalent of one flit at a 512 Megahertz rate, the variable rate with which the input buffer receives commands and associated data will vary between 128 Megahertz, in the case of a four-flit packet, and 256 Megahertz, in the case of a two-flit packet. Three-flit packets will be received at the rate of 166 Megahertz. The 128 bits at 512 Megahertz can either be achieved using a 128-bit wide bus operating at 512 Megahertz, or by performing further serialization of the data stream such that a 32-bit bus operating at approximately 2 Gigahertz is able to provide the 128 bits at 512 Megahertz rate.

If the average number of flits required to transfer a command and its corresponding data is three flits, the fixed operating speed of the operation unit (166 Megahertz in the example) may be configured to, on average, keep up with the data being received from the graphics processing circuit 202. However, a number of two flit packets received in quick succession may overload the buffer capabilities of the input buffer 210.

Figure 4:
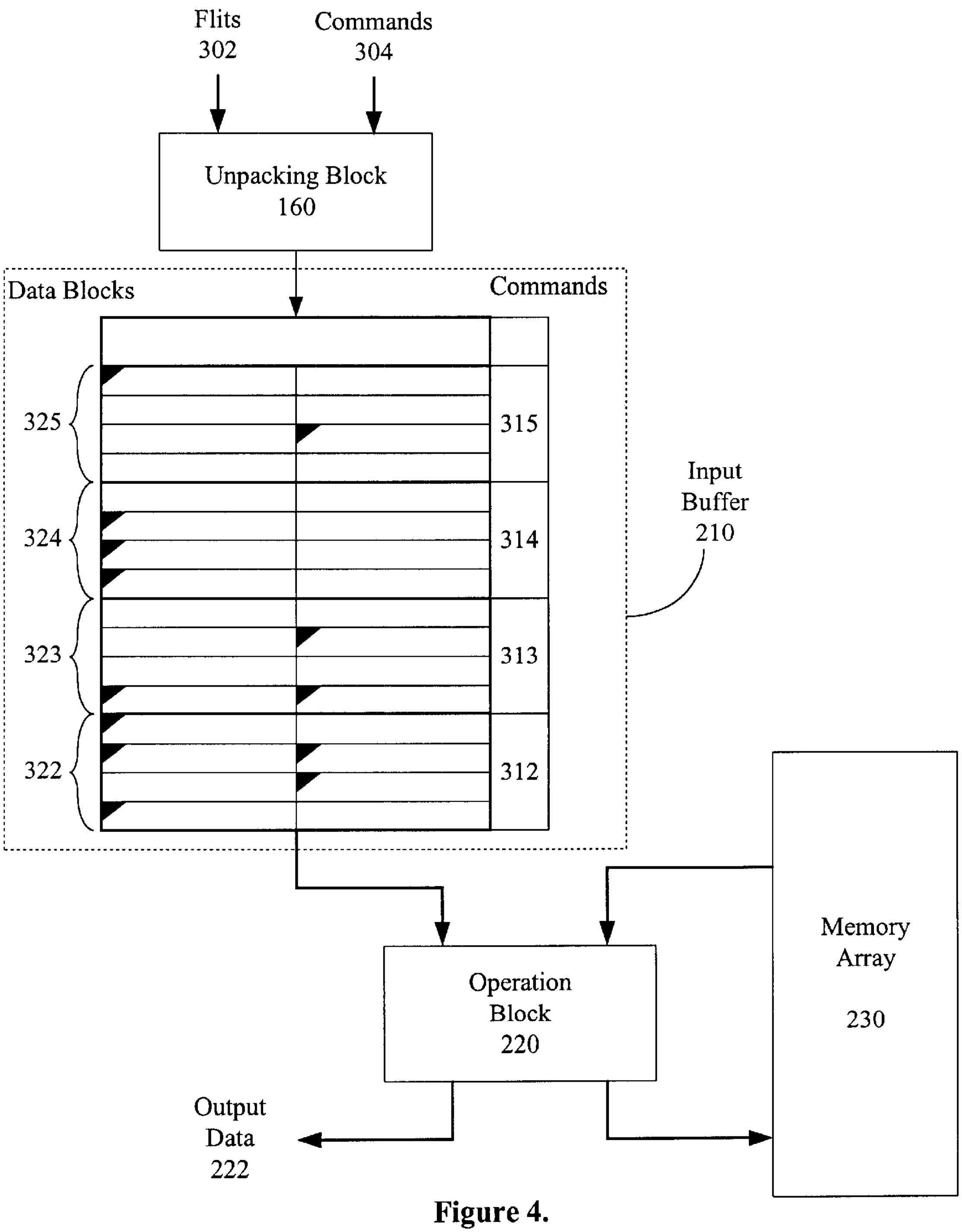
FIG. 4 illustrates a block diagram of the input portion of the logic enhanced memory in accordance with a particular embodiment of the present invention.

Referring to FIG. 4, the unpacking block 160 receives flits 302 and commands 304, where each command includes an amount of data that is transferred via one or more flits 302. In one embodiment, the minimum number of flits per command is two, whereas in other embodiments, a single flit may make up the set of data for a particular command.

The unpacking block 160 unpacks the flits as was described with respect to FIG. 2 above to reconstruct the fragment blocks, which may also be referred to as data blocks, that are stored in the input buffer 210. The input buffer 210 is shown to include four commands 312–315 and their accompanying data blocks 322–325. As was the case with FIG. 2 above, valid fragments are indicated in each of the fragment blocks 322–325 by a shaded triangle in the upper left hand corner of a particular location. In the example shown in FIG. 4, each fragment block includes eight locations.

The input buffer 210 preferably includes buffering capability for enough unpacked fragment blocks and corresponding commands such that those fragment blocks that require multiple flits will generally balance out with those fragment blocks that require fewer flits. As such, the average rate of receipt of commands and corresponding fragment blocks may approach the fixed processing rate of the operation block 220 such that the operation block 220 is efficiently utilized.

Operations performed by the operation block 220 can include blending operations as well as a number of other operations that may result in the production of output data 222. Examples include read operations that read image data from the frame buffer stored in the memory array 230 for the generation of a display signal. Referring back to FIG. 3, in order to facilitate the efficient transference of the results included in the output data 222 from the logic enhanced memory 204 to the graphics processing circuit 202, the output buffer 240 is included in the logic enhanced memory 204.

The output buffer 240 preferably operates in a similar manner as the input buffer 210 in that it stores fragments blocks, or data blocks in a similar manner. The packing block 250, which is coupled to the output buffer 240, compresses the data blocks in a similar manner as the packing block 130 for transference across a bus 208 that may not be as wide as the bus 206. The transference of data across the bus 208 occurs at a fixed rate, whereas the rate at which the output buffer 240 receives data may be a variable rate based on the commands being executed.

The unpacking block 270 of the graphics processing circuit 202 unpacks the flits generated by the packing block 250 in order to reconstruct the data blocks. These unpacked data block are then provided to the controller 280 for distribution to the appropriate entity that requested the data from the logic enhanced memory 204.

In graphics applications, a large number of primitives are typically be processed to produce image data in the frame buffer for each frame that is used to generate a portion of the display signal. Thus, a large number of fragments are transferred across the bus 206 and blended with the image data stored in the frame buffer before a final image is created that is used to generate a portion of the display signal. The operations performed by the graphics processing circuit 202 that require the retrieval of data from the memory array 230 are typically much less frequent than the operations that require data to be passed from the graphics processing circuit 202 to the logic enhanced memory 204. As such, the output buffer 240 and the bus 208 may be proportionally smaller than the bus 206 and the input buffer 210.

In order to ensure that the buffering capabilities of the input buffer 210 and the output buffer 240 are not exceeded, the logic enhanced memory controller, or controller 280, selectively issues the commands that are provided to the logic enhanced memory 204 based on the capacity of the input buffer 210 and the capacity of the output buffer 240. In order to ensure that the capacity of the input buffer 210 is not exceeded, the controller 280 may include a first counter that is used to store history data corresponding to the types of commands that have been issued across the bus 206 and stored in the input buffer 210. The counter is updated based on the amount of data for each command that is issued to the logic enhanced memory 204. Because the controller 280 is aware of the speed with which the operation block 220 empties the input buffer 210, by maintaining information as to how quickly new commands are being stored in the input buffer 210, the controller 280 can determine when the capacity of the input buffer 210 has been reached.

This technique for monitoring use of the input buffer does not require any feedback information to be provided from the logic enhanced memory 204 to the controller 280. As such, the bus 206 can be unidirectional. The lack of such flow control signals between the circuits helps to conserve pin count, thus reducing costs.

Even though each command that is sent across the bus 206 may include a different amount of data, each command may be stored using a predetermined amount of space within the input buffer, where the predetermined amount of space is equal for each command and its associated data. Referring to FIG. 4, the data block 322 includes five valid pixel fragments, and as such would require three two-fragment flits in order to be transferred across the bus 206. However, the data block 322 takes up the same amount of space in the input buffer 210 as the data block 323, which only includes enough valid entries to require two flits for transference across the bus 206. As such, each time the operation block 220 processes a command stored in the input buffer 210, a particular amount of space is made available within the input buffer 210. In other words, the outflow of data from the input buffer 210 is at a constant rate, whereas the inflow to the input buffer 210 is at a variable rate dependent upon how many flits are required to transfer the command across the bus 206.

In an example embodiment where command and associated data are sent across the bus 206 in one of two, three, or four flit sets, the counter maintained by the controller 280 for monitoring the fill level of the input buffer 210 can be incremented and decremented based on the number of flits required to send each command across the bus 206. Because commands relayed using only two flits will fill the input buffer 210 more rapidly, the input buffer counter 282 may be incremented each time a command is sent out using only two flits. Similarly, commands that require four flits may take more time to transfer across the bus 206 than is required for their execution in the operation block 220. As such, the input buffer counter 282 may be decremented each time a command requiring four flits is transferred across the bus 206. In the example case, those commands requiring three flits may be transferred across the bus 206 at a similar rate as they are executed in the operation block 220. Based on this, the input buffer counter 282 may simply be left in its current state each time a command requiring three flits is transferred across the bus 206.

If the controller 280 determines that the input buffer counter 282 exceeds a high threshold level, thus indicating that the storage content of the input buffer is above a high threshold level, the logic enhanced memory controller can issue a non-operative (NOP) such that when the NOP command is received by the logic enhanced memory 204, the NOP command will not be stored in the input buffer. This type of NOP command is intended to allow the input buffer 210 to empty out, and therefore does not store any new information in the input buffer. By inserting such NOP commands, the operation block 220 can catch up with the commands stored in the input buffer 210. Once the input buffer 210 has been at least partially emptied, commands can once again be sent across the bus 206. Each time this type of input buffer emptying NOP command is sent out by the controller 280, the input buffer counter 282 may be decremented to reflect the resulting state of the input buffer 210.

Similarly, when the counter indicates that the input buffer is below a low threshold level, thus indicating that the input buffer 210 is not receiving commands and associated data at a high enough rate in comparison to the speed with which the operation block 220 is processing these commands, a different type of NOP command may be sent out by the controller 280. This type of NOP command is intended to provide a placeholder in the input buffer 210 such that the operation block 220, which may expect a command every cycle is not starved for commands. However, the NOP commands of this type that are sent across are simply stored in the input buffer 210 and result in the operation block performing a NOP (null operation) when they are retrieved or provided to the operation block 220. In some embodiments, a non-operative command generation block may be included in the logic enhanced memory 204, where the non-operative command generation block determines that the input buffer is below a low threshold level and inserts NOP commands into the input buffer based on this determination. As such, these NOP commands will result in the operation block 220 performing null operations. As such, rather than forcing the controller 280 to determine when too few instructions are being transferred across the bus 206, a block local to the logic enhance memory 204 can perform a similar function to ensure that the operation block 220 is not starved of commands.

In other embodiments of the present invention, the controller 280 may include buffers that store commands of different data sizes separately. By selectively issuing these commands in a manner that balances out the speed with which commands are sent across the bus 206, the variable rate of command transfer can be configured to closely match the execution rate of the operation block 220.

As stated earlier, some of the operations performed by the operation block 220 result in the production of resultant data that is to be transferred back to the graphics processing circuit 202. For example, color data may be read from the frame buffer in the memory array 230 for use in generating a display signal. Such data is provided by the operation block 220 to the output buffer 240. In order to ensure that the capacity of the output buffer 240 is not exceeded, the controller 280 may also store history data corresponding to the production, or likely production, of resultant data by the operation block 220. This may be accomplished through the use of an output buffer counter 284 that operates in a similar manner as the input buffer counter 282.

In some instances, a certain operation performed by the operation block 220 may or may not result in the production of resultant data that is fed back to the graphics processing circuit 202. As such, the controller 280 may perform a worst-case analysis and assume that data is to be received in response to such commands. Because the outflow of data from the output buffer 240 is generally fixed, whereas the inflow of data to the output buffer 240 can vary, the output buffer counter 284 is intended to provide a reasonable expectation as to the current amount of data stored in the output buffer 240.

Each time a command is issued by the controller 280 that may result in the production of resultant data that utilizes the output buffer 240, the output buffer counter 284 may be incremented to reflect the addition of potential data to the output buffer 240. Rather than decrementing this counter when instructions that do not require use of the output buffer are issued, the controller 280 may simply decrement the output buffer counter 284 when it receives data back from the logic enhanced memory 204 via the unpacking block 270. Thus, a feedback loop is included for data that traverses through the output buffer 240. As such, the controller 280 may simply rely on this feedback loop to update its history data stored in the output buffer counter 284 to determine whether or not additional commands that may utilize the output buffer 240 should be issued.

If the controller 280 determines that the output buffer 240 is full, or nearing the point where it may be full, the controller 280 may cease from issuing commands that may result in the production of resultant data that will utilize the output buffer 240. The controller 280 may select other commands that will not result in the production of any resultant data such that the output buffer 240 will have time to at least partially empty before additional commands that may result of inflow of data into the output buffer 240 are issued. In other cases, the controller 280 may simply issue NOP commands that cause the operation block 220 to perform null operations such that the current contents of the output buffer 240 can be transferred across the bus 208. A determination as to whether the output buffer 240 has reached its fill threshold, or the point where issuance of commands that have a potential for producing output data should be halted, can be determined based on the current state of the output buffer counter 284.

Figure 5:
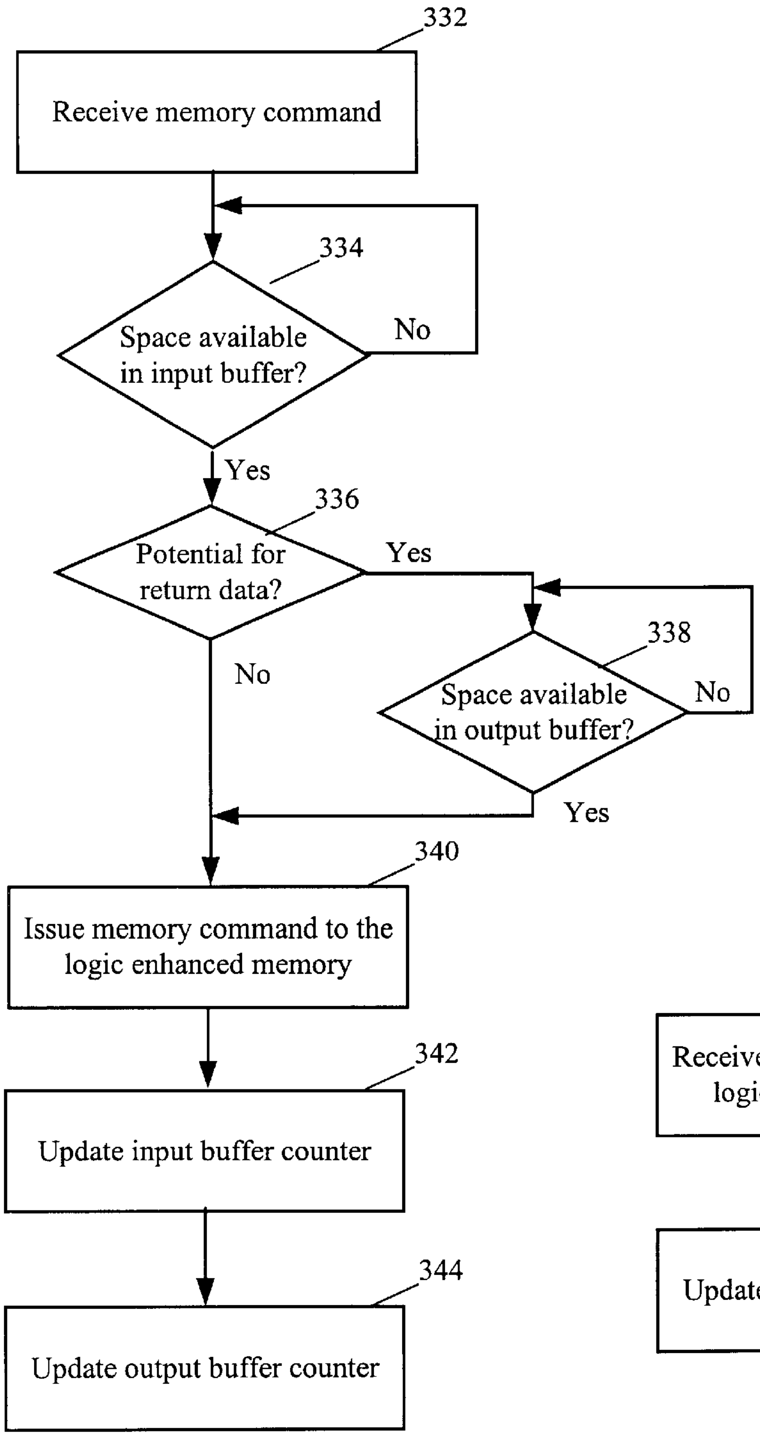
FIG. 5 illustrates a flow diagram of a method for controlling the issuance of data and instructions to the logic enhanced memory by the graphics processing circuit in accordance with a particular embodiment of the present invention.
Figure 6:
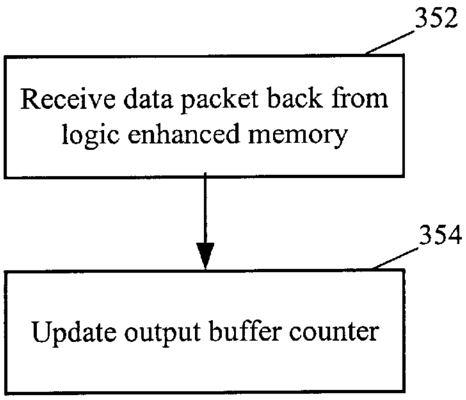
FIG. 6 illustrates a flow diagram of a method for maintaining history data as to output data expected from the logic enhanced memory in accordance with a particular embodiment of the present invention.

FIG. 5 illustrates a flow diagram corresponding to a method for controlling the issuance of memory commands to a logic enhanced memory circuit over a bus of limited bandwidth. The method begins at step 332 where a memory command is received. The memory command may be received by a logic enhanced memory controller such as the controller 280 described with respect to FIG. 3 above. The memory command may be received from the fragment combining block 120, where such a memory command may correspond to a blending operation to be performed using a fragment block that includes one or more pixel fragments. In other cases, the memory command may be received by one or more of additional blocks 260 such as a block responsible for generating a display signal based on data stored within a frame buffer.

At step 334, it is determined if there is space available in the input buffer of the logic enhanced memory. A determination as to whether or not space is available in the input buffer may be based on an expected processing speed of the operation block in the logic enhanced memory circuit and historical data that corresponds to an expected transfer speed of previously issued memory commands across the bus. Thus, if a large number of small commands have recently been sent such that the input buffer is likely to be full, historical data will reflect this and possibly indicate that there is not space available in the input buffer. If no space is available in the input buffer, the controller may simply continue checking until space is available or may issue a NOP command that is transferred across the bus to the input buffer but does not result in additional data being stored in the input buffer.

If it is determined at step 334 that there is space available in the input buffer, the method may proceed to determine whether or not there is any possibility of overfilling an output buffer associated with the logic enhanced memory. In some cases, such checking as to whether an output buffer may be overfilled may not be performed. If the status of an output buffer is being monitored, at step 336 it is determined whether or not there is a potential for return data resulting from the issuance of the memory command. If so, the method proceeds to step 338 where it is determined whether or not there is space available in the output buffer for the potential return data. This may be determined based on additional historical data that reflects the potential for return data of previously issued memory commands and how much of that potential data has already been received. If there is not space available in the output buffer, the method may wait at step 338 until there is space available, or may choose to issue a different memory command that is pending where the different memory command does not have the potential for return data.

If it is determined at step 336 that there is no potential for return data or if it is determined at step 338 that there is space available in the output buffer, the method proceeds to step 340 where the memory command is issued to the logic enhanced memory circuit. Issuing the command to the logic enhanced memory circuit may include packing the data associated with the command in a similar manner as to that described with respect to FIG. 2 above. Based on the issuance of the command, the historical data is updated at steps 342 and 344. At step 342 an input buffer counter is updated to reflect the amount of data included in the memory command that was issued at step 340. This may be performed as described with respect to FIG. 3 above.

The historical data that indicates what the current state of the output buffer is is updated at step 344. This may include incrementing or decrementing a counter to reflect the expected contents of the output buffer following execution of the command issued at step 340. As was described above, a feedback loop exists that allows the contents of the output buffer to be monitored. Utilization of the feedback loop includes steps shown in FIG. 6. At step 352, a data packet or data block is received back from the logic enhanced memory circuit. The controller can determine to which instruction the data packet corresponds and update the output buffer counter at step 354 to reflect the expected state of the output buffer based on the receipt of the data packet at step 352. For example, if a first instruction is issued that has a potential for generating output data, and a second instruction is issued thereafter that also includes a potential for output data, the counter may be updated to reflect that the output buffer may store data for each of these commands. However, if the controller receives back a data packet corresponding to the second command before any data is received back for the first command, it may be assumed that the first command did not result in any output data, and as such the output buffer counter can be updated to reflect that the data expected for both the first and second commands is no longer in the output buffer.

Figure 7:
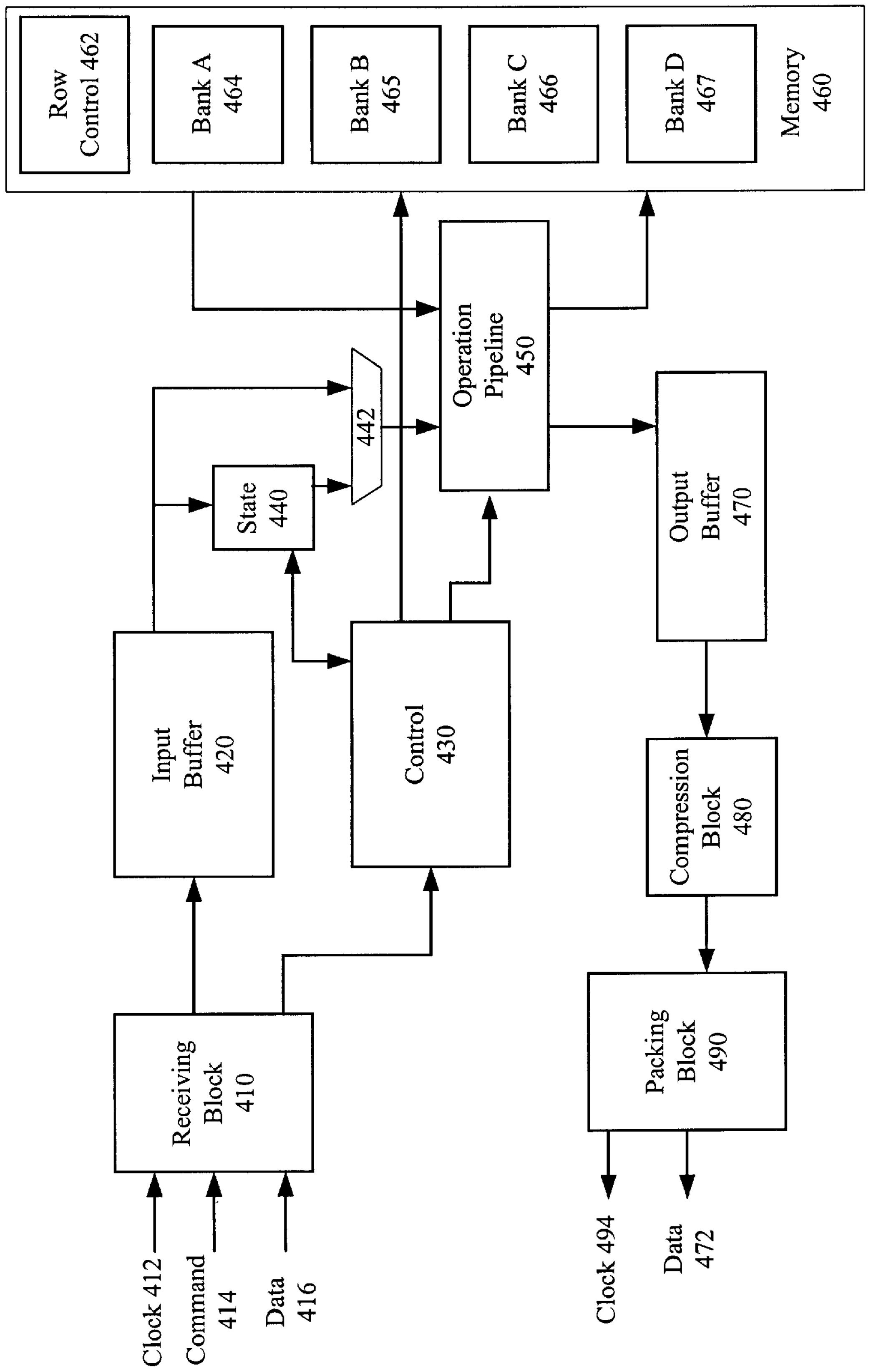
FIG. 7 includes an illustration of a block diagram of a more detailed view of a logic enhanced memory circuit in accordance with a particular embodiment of the present invention.

FIG. 7 illustrates a more detailed block diagram of a particular embodiment of the logic enhanced memory circuit described in FIGS. 1–4 above. The logic enhanced memory circuit includes a receiving block 410 that receives a clock 412, command information 414, and data 416. The receiving block 410 may include unpacking circuitry such that the packing techniques described in detail with respect to FIG. 2 above can be utilized to increase the efficiency of the usage of available bandwidth to the logic enhanced memory circuit. The clock 412 is a high-speed clock associated with the high-speed bus that provides the data 416 and command information 414. The receiving block 410 may include de-skewing circuitry that divides this high-speed clock to produce a core clock that is provided to the other blocks within the logic enhanced memory. In one embodiment, the high-speed clock rate is 2 Gigahertz, and this clock is divided by six to produce the core clock used by the other blocks in the logic enhanced memory.

The data 416 is preferably received in flits as described above with respect to FIG. 2 above. The flits are unpacked and forwarded by the receiving block 410 to the input buffer 420. The data 416 is grouped into data blocks, which in the case of a blending operation will be a fragment block that includes one or more valid fragments for blending. Each data block received by the receiving block 410 and buffered in the input buffer 410 corresponds to a particular column command to be executed.

The command information 414 may be conveyed over a number of signal lines. In one embodiment, three signal lines carry the command information 414. Of these signal lines, one is dedicated to carrying row commands, where the other two are dedicated to carrying column commands. Assuming that information is retrieved from these signal lines on both the rising and the falling edges of the clock 412, a total of six bits of command data can be captured during each clock period.

The receiving block 410 de-serializes commands received over the limited set of lines. In one embodiment, the receiving block 410 constructs sixteen bit commands from the one or two bits received per clock edge prior to forwarding these commands to the control block 430. In other embodiments, the receiving block 410 may only partially de-serialize the commands such that four bit sets of command data are forwarded to the control block 430 which finishes the de-serialization process to obtain complete commands.

The control block 430 oversees the execution of the various commands received from the receiving block 410. Each command, whether a column command or a row command, includes a control portion, which is the portion that the control block 430 utilizes to either access the memory 460, or direct the functions performed by the operation pipeline 450. When the control block executes the control portions of each command, control information corresponding to the command is generated that is then provided to other blocks in the system. Some of the control information generated is directed towards the memory 460.

The memory 460 is preferably a DRAM memory structure that includes a plurality of banks 464–467. Row commands executed by the control block 430 produce row control information that is provided to the row control block 462. The row control block 462 selects a particular bank and a particular row within that bank. Once a row within a bank has been selected by the row control block 462, the data corresponding to all of the columns for that row can be accessed. Thus, a first column command may select a certain portion of the data stored within the row, and a subsequent column command can select a different portion of the data contained within the row. Thus, multiple column commands may be associated with a single row command.

Furthermore, multi-bank DRAMS provide added efficiency in that an access to one bank can quickly be followed by an access to another bank without suffering the timing penalties associated with switching between rows in a single bank. Thus, a row access to a particular row in bank A can be initiated, where a number of column commands for that row can be executed subsequent to the selection of that row. Another row command that corresponds to bank B can be initiated while the column accesses to bank A are ongoing. Thus, bank B can be "set up" such that the row data selected in bank B is waiting for column commands that can be responded to in a very fast and efficient manner.

Because multiple column commands can pertain to a single row command, numerous row commands may be received while column commands are still active for a different row command. As such, a row command buffer may be included within the control block 430 such that row commands pending execution can be stored until the column commands associated with the previously executed row command have completed. For example, assume that a row command pertaining to a particular row of bank A 464 is received and executed, and multiple column commands corresponding to that row command are subsequently received. Subsequently, another row command corresponding to bank A 464 is received prior to the completion of execution of the column commands. This subsequent row command can be stored in the row command buffer until these column commands have completed execution.

In order to determine when all of the column commands for a particular row command have been received and executed, column commands may include a flag bit. If the flag bit is set (or cleared depending on the logic state used to indicate the final column command) the column command is determined to be the final column command for a corresponding row command. When a column command with such an indication is executed, the control block 430 moves on to the next row command that was received.

Figure 8:
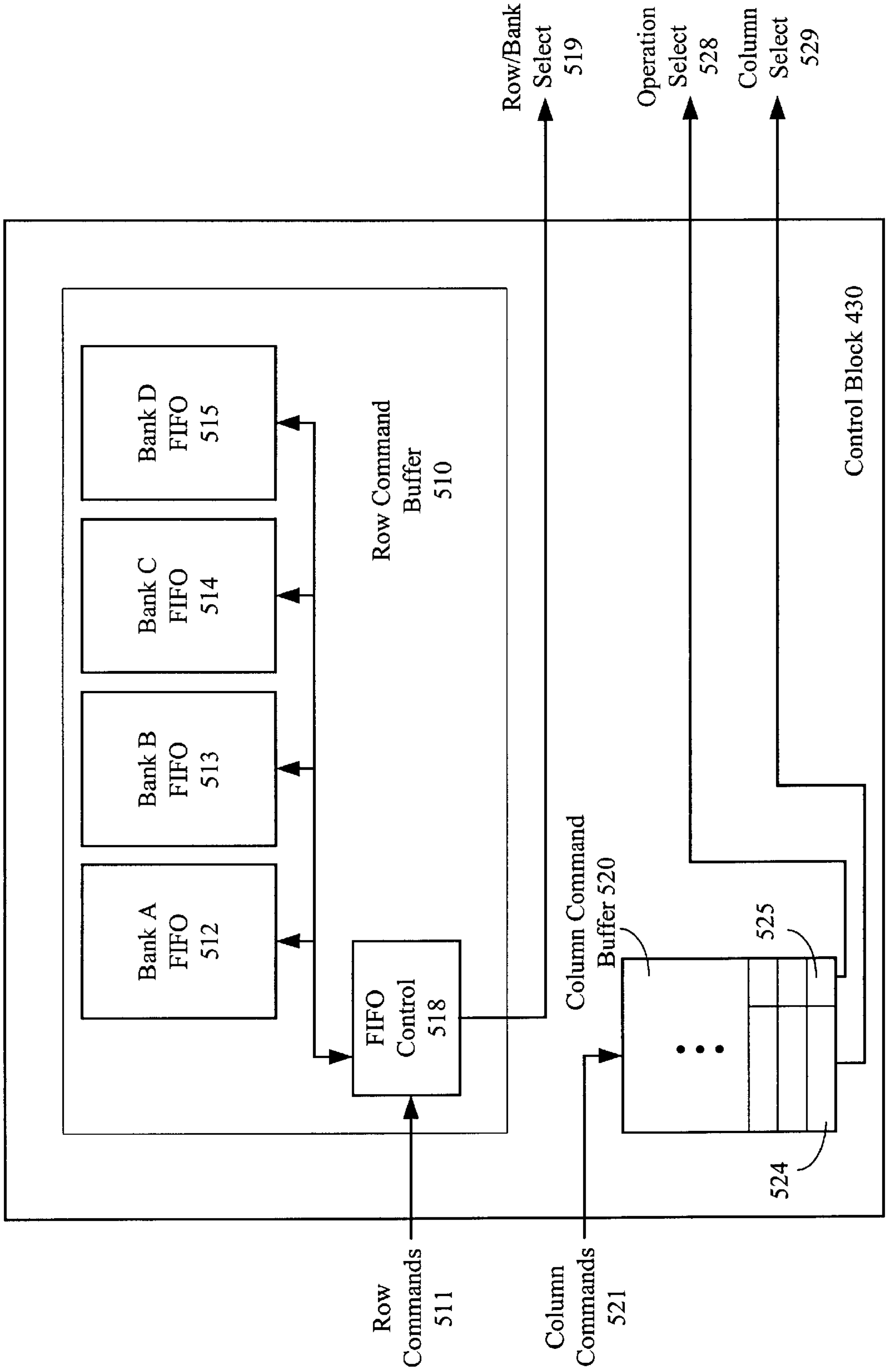
FIG. 8 illustrates a block diagram of a more detailed view of the control block included in the logic enhanced memory circuit of FIG. 7 in accordance with a particular embodiment of the present invention.

Referring to FIG. 8, a row command buffer 510 may include a plurality of first-in-first-out (FIFO) buffers 512–515, where each FIFO is associated with one of the memory banks. Row commands 511 that are received are sent into a FIFO control block 518, and the FIFO control block 518 may store the row commands 511 in the appropriate bank pending their execution. When all of the column commands for a particular row command have been executed, the next row command for the bank to which the exhausted row command corresponds is fetched by the FIFO control block 518 and executed to produce a row/bank select signal 519.

By including a set of bank FIFOs 512–515, one row can be active in each bank at all times, and subsequently received row commands that correspond to a bank that already has an open row can be stored in the appropriate bank FIFO prior to execution. Similarly, a column command buffer 520 may be included to store column commands 521 that are received. Each column command stored in the column command buffer 520 includes an operation selection portion 525 and a column selection portion 524. When the command is executed, an operation select signal 528 is generated based on the operation selection portion 525, and column selection information 529 is generated from the column selection portion of the column command.

In a simple example that may help to illustrate the functionality of the buffering operations within the control block 430, a first row command corresponding to a first row in bank A is received. If it is assumed that there is not an active row in bank A when this row command is received, the row command can be executed to produce row/bank selection information 519 that is provided to the memory 460. As a result, the first row in bank A is activated and prepared for column accesses. Subsequently received column commands are executed to fetch data from the memory 460 from the first row of bank A. While these column commands are executing, a second row command corresponding to a second row in bank A is received. Because the first row is currently active in bank A, the subsequent row command for bank A is buffered in the bank A FIFO 512 by the FIFO control block 518. When a column command corresponding to the first row command for bank A is received that includes a flag that indicates that it is the final column command for the first row command, bank A is deactivated following execution of that column command. When the timing constraints for deselecting bank A 464 have been satisfied, the second row command corresponding to bank A is executed to reactivate bank A such that data in the second row can be accessed by subsequent column commands received.

As is apparent to one of ordinary skill in the art, while the second row of bank A is being activated, data fetches to another bank may be occurring. As such, the inactive time for the memory 460 is minimized. For example, if it is assumed that a row command corresponding to bank B 465 is received after the first row command for bank A, and no rows in bank B are active when that row command for bank B is received, the row command for bank B can be executed. As such, a particular row in bank B is readied for column accesses. When accesses to bank A based on the first bank A row command have completed, a rapid changeover to access bank B 465 can be performed with minimal timing penalties.

Thus, by separating the data stored within the memory 460 into a number of different banks, rapid access to the memory 460 can be generally assured, as it is likely that accesses to alternating banks will result from the distribution of data amongst the multiple banks. The technique used for separating the data stored into the multiple banks can be based on the type of data stored and the types of accesses expected. For video graphics applications, tiling the image data for the frame where different tiles are stored in different banks may be desirable.

Returning to FIG. 7, the operation selection information derived from each column command is provided to the operation pipeline 450. The operation selection information indicates the particular operation to be performed by the operation pipeline 450. For each operation, the operation pipeline 450 receives operands that may include a data packet, or data block, corresponding to the column command being executed from the input buffer 420, and a similar stored data packet that is retrieved from the memory 460 based on the current row command and the column to which the operation corresponds.

The operation pipeline 450 can preferably perform a number of operations based on the receipt of these operands to produce at least one result packet or data block. The result packet can be stored in either the memory 460 or an output buffer 470. In some embodiments, the operation pipeline 450 produces two result packets, where one is stored in the output buffer 470 and the other is stored back into the memory 460. Storing a result packet back in memory 460 may be performed such that the data is stored back into the same location from which the input stored data packet was retrieved.

A simple example of an operation performed by the operation pipeline 450 is a blending operation for video graphics data. The row command received by the control block 430 selects a particular row within a particular bank of the memory 460. A subsequently received column command, which is accompanied by a data packet that includes a plurality of pixel fragments, is executed by the control block 430 to select a particular stored data packet within the row and bank selected by the row command. Preferably, the stored data packet includes pixel data that is to be blended with the received fragments. The pixel data preferably includes color information and Z information. In one embodiment, color and Z information for eight pixels is retrieved from the memory 460. In such an embodiment, the operation pipeline 460 receives the pixel data from the memory 460 as well as up to eight fragments stored in an input data packet, which received from the input buffer 420. The operation pipeline performs the Z comparison and potential color blending for each fragment included in the input data packet such that a resulting data packet is produced that includes the results of blending the received fragments with the pixel data currently stored in the memory. This resulting data packet is then stored back into memory at the same location from which the pixel data was originally retrieved.

Blending operations performed for video graphics operations may include support for stencil operations and alpha blending operations. Stencil and alpha blending operations are known in the art, and the specific circuitry required to perform such operations within the operation pipeline 450 based on commands received can be readily determined.

The operation pipeline 450 can perform a number of other operations based on column commands received. Another example is a swapping function, where the input data packet for the column command received by the operation pipeline 450 from the input buffer 420 is stored into the memory 460 at a location from which a stored data packet has been retrieved. The stored data packet that is provided to the operation pipeline 450 as a part of this operation is then provided to the output buffer 470 as an output data packet. As such, data received corresponding to the column command is effectively swapped with data currently stored in the memory 460 at a location indicated by the column command and its associated row command.

Another operation that can be performed by the operation pipeline 450 is a clearing function, where cleared data, which may be represented by all 0's or all 1's or some other bit combination, is written into the memory 460 at the location selected by the column command and its associated row command. In the case of a clearing operation, the column command may not be accompanied by an input data packet, and the clearing values may be derived from a register included in the logic enhanced memory circuit. Such a register may be included in a set of state registers 440 that can be selected rather than input data from the input buffer 420 through the use of the multiplexer 442. Thus, the state registers 440 may include a clearing register that stores a value that is to be used when a clearing function is performed by the operation pipeline 450. Clearing functions may be beneficial when the current contents of the frame buffer, and more particularly the current set of Z data for all of the pixels or portions of the pixels in the frame buffer, is to be cleared. This may occur following the generation of a display signal based on the current state of the frame buffer.

Another operation that can be performed by the operation pipeline 450 is a writing function that stores at least a portion of an input data packet accompanying the column command in a selected location of the memory 460, where the selected location is determined based on the column command and its associated row command. Thus, a data packet is received along with the column command, and one or more of the locations within that data packet contains valid data that is to be used to overwrite a portion of the selected data block in the memory 460. The determination as to which portions of the input data packet are to be used when overwriting the memory can be determined based on a mask that is included in the column command.

A similar mask can also be used for the blending command described above as well as for read commands, where for a read command only portions of the data in the selected packet retrieved from memory may be desired by the requesting entity. For example, an entity may only wish to fetch color data corresponding to a particular portion of the frame buffer. As such, a data block within that portion is provided to the operation pipeline 450, and the operation pipeline 450 selects the portions based on the mask that are then included in the data packets stored in the output buffer 470. When data is fed back to the graphics processing circuit, or other entity that is controlling the logic enhanced memory, it may be compressed by the compression block 480 and packed by the packing block 490 prior to be sent as data 472 that may be accompanied by a synchronized clock 494 such that the unpacking block that receives such packed data can more easily unpack it. The compression and packing performed by the compression block 480 and the packing block 490 may be similar to the techniques used when sending fragment blocks across the high speed bus to the logic enhanced memory as described in detail with respect to FIG. 2 above.

Read operations performed by the operation pipeline 450 may be used to retrieve the color data stored in the frame buffer such that a display signal can be generated. In order to execute column commands associated with read operations, input data packets are typically not required. As such, a null value may be provided as one of the input operands to the operation pipeline 450, whereas the other input operand is the selected data block retrieved from memory that stores the information desired for the read operation. The operation pipeline 450 can then use a mask register to determine which portions of the data block should be included in the resulting packet stored in the output buffer 470.

The state registers 440 may store other information relevant to the operations performed by the operation pipeline 450. For example, a state register may store an indication as to what the orientation of the Z axis is in terms of numerical representation of points on that Z axis. For example, low Z values may represent objects that are closer to the viewer in one embodiment, whereas in another embodiment higher Z values may be used to represent objects that are closer to the viewer.

Other state registers may be dedicated to storing control information related to alpha blending or stencil operations. State registers can be reconfigured based on column commands that address specific locations associated with the state registers. As such, these column command may include mask registers such that only portions of the data packet associated with the column command that is stored in the input buffer 420 is sent to the state register 440 to modify the current value stored in a particular state register. Because the input packets typically include a large number of bytes, multiple state registers may be modified by a single column command.

By providing an efficient means for relaying pixel fragment data to a logic enhanced memory that includes circuitry from performing blending operations, the speed with which graphics processing is performed can be greatly increased. As a result, much higher pixel processing rates can be obtained. Furthermore, sending this data in a packed form over a bus allows for conservation of pin count on the integrated circuits associated with both the graphics processing circuit and the logic enhanced memory that stores the frame buffer and blending circuitry. The inclusion of buffers on both ends of the data buses that convey information between the graphics processing circuit and the logic enhanced memory allows for compensation of the variable speed with which commands and data are sent across these buses while they are processed at a fairly regular, predetermined rate. By including mechanisms that keep track of the state of these buffers, it can be assured that buffer overflow conditions to not result. The use of multiple column commands associated with a single row command and the performance of block operations enables memory fetches associated with blending operations, data reading operations, and the like to be performed in a much more efficient manner such that overall memory access speed is enhanced.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A graphics processing system comprising:

a graphics processing circuit that includes:

a graphics processing pipeline that generates pixel fragments;

a fragment combining block operably coupled to the graphics processing pipeline, wherein the fragment combining block groups pixel fragments received from the graphics processing pipeline into fragment blocks, wherein each fragment block includes locations for a predetermined number of pixel fragments, wherein locations within each fragment block within which the fragment combining block has stored a pixel fragment are filled locations, wherein the fragment combining block outputs fragment blocks that are at least partially filled, wherein when the fragment combining block outputs a fragment block, the fragment block is accompanied by a set of flags, wherein the set of flags indicates which locations in the fragment block that is being outputted are filled locations;

a packing block operably coupled to the fragment combining block, wherein the packing block generates a stream of data based on pixel fragments stored in filled locations within fragment blocks received from the fragment combining block, wherein the stream of data is constructed based on the set of flags that accompanies each fragment block received; and an enhanced memory circuit operably coupled to the graphics processing circuit, wherein the enhanced memory circuit includes:

a frame buffer that stores image data corresponding to a frame;

an unpacking block operably coupled to the packing block of the graphics processing circuit, wherein the unpacking block receives the stream of data and the sets of flags corresponding to the fragment blocks used to construct the stream of data, wherein the unpacking block reconstructs the fragment blocks used to construct the stream of data from the stream of data, wherein reconstruction of the fragment blocks utilizes the sets of flags corresponding to the fragment blocks used to construct the stream of data; and a render backend block operably coupled to the unpacking block and the frame buffer, wherein the render backend block blends pixel fragments contained within fragment blocks reconstructed by the unpacking block with image data in the frame buffer, wherein blending performed by the render backend block is on a block-by-block basis such that pixel fragments included in each fragment block are blended in parallel.

2. The graphics processing system of claim 1 further comprises a bus operably coupled to the graphics processing circuit and the enhanced memory circuit, wherein the bus transports the stream of data from the graphics processing circuit to the enhanced memory circuit.

3. The graphics processing system of claim 2, wherein sets of flags transferred from the graphics processing circuit to the enhanced memory circuit are carried by the bus.

4. The graphics processing system of claim 2 further comprises at least one additional signal line operably coupled to the graphics processing circuit and the enhanced memory circuit, wherein sets of flags transferred from the graphics processing circuit to the enhanced memory circuit are carried by the at least one additional signal line.

5. The graphics processing system of claim 2, wherein the enhanced memory circuit is an enhanced dynamic random access memory (DRAM) circuit that includes a DRAM memory array that stores the frame buffer.

6. The graphics processing system of claim 5, wherein the graphics processing pipeline includes three-dimensional graphics processing circuitry.

7. The graphics processing system of claim 6, wherein pixel fragments within the graphics processing system include color data and Z data.

8. The graphics processing system of claim 7, wherein the color data for each fragment includes at least 32 bits and the Z data for each fragment includes at least 32 bits.

9. The graphics processing system of claim 8, wherein the predetermined number of pixel fragments included in each fragment block is an integer greater than seven.

10. The graphics processing system of claim 9, wherein the bus is no greater than 128 bits wide, and wherein the packing block generates the stream of data such that the width of the stream of data complies with width limitations of the bus.

11. The graphics processing system of claim 1, wherein the graphics processing circuit is first integrated circuit and the enhanced memory circuit is a second integrated circuit.

12. A method for transmitting data packets across a bus that connects a first integrated circuit and a second integrated circuit, comprising:

receiving a data block within the first integrated circuit that includes a plurality of entries, wherein at least a portion of the entries are valid entries;

generating a set of flags corresponding to the data block, wherein the set of flags indicates which entries of the data block are valid entries;

compiling the data block into a set of transmission blocks, wherein each transmission block includes at least one valid entry, wherein the set of transmission blocks includes at least one transmission block;

sending each transmission block across the bus to the second integrated circuit;

sending the set of flags to the second integrated circuit; and reconstructing, in the second integrated circuit, the data block from the set transmission blocks and the set of flags.

13. The method of claim 12, wherein receiving the data block further comprises selecting the data block from a plurality of data blocks, wherein selection is based on at least one of a time period during which at least one valid entry has been included in the data block and a number of valid entries included in the data block.

14. The method of claim 13, wherein the plurality of data blocks correspond to portions of a pixel array, wherein a valid entry in a data block of the pixel array corresponds to a pixel fragment that is to be blended with image data stored within the second integrated circuit.

15. The method of claim 12, wherein each transmission block includes two locations, wherein each location can store a valid entry of the data block, wherein the set of transmission blocks includes no more than one invalid entry.

16. A method for processing video graphics primitives, comprising:

receiving a video graphics primitive;

generating pixel fragments from the video graphics primitive;

grouping portions of the pixel fragments in fragment blocks based on corresponding groupings within a frame buffer;

when a fragment block is ready for blending, generating a set of flags for the fragment block, wherein the set of flags indicates which locations within the fragment block include valid pixel fragments;

generating a stream of data based on valid pixel fragments included in the fragment block as indicated by the set of flags corresponding to the fragment block; and transmitting the stream of data along with the set of flags.

17. The method of claim 16 further comprises:

receiving the stream of data and the set of flags;

reconstructing the fragment block from the stream of data based on the set of flags; and blending the fragment block with corresponding pixel data stored in the frame buffer.

18. The method of claim 17, wherein transmitting the stream of data further comprises transmitting the stream of data over a bus that couples a first integrated circuit with a second integrated circuit, wherein the second integrated circuit includes a memory array that stores the frame buffer.

19. The method of claim 16 further comprises determining that the fragment block is ready for blending based on at least one of: a number of valid pixel fragments included in the fragment block, and a length of time during which at least one valid pixel fragment has been included in the fragment block.

20. The method of claim 16, wherein each pixel fragment includes color data and Z data.

* * * * *